Jan. 7, 1964   W. MORELLO, JR   3,116,942
QUICK COUPLING DEVICE
Filed Oct. 10, 1960   2 Sheets-Sheet 1
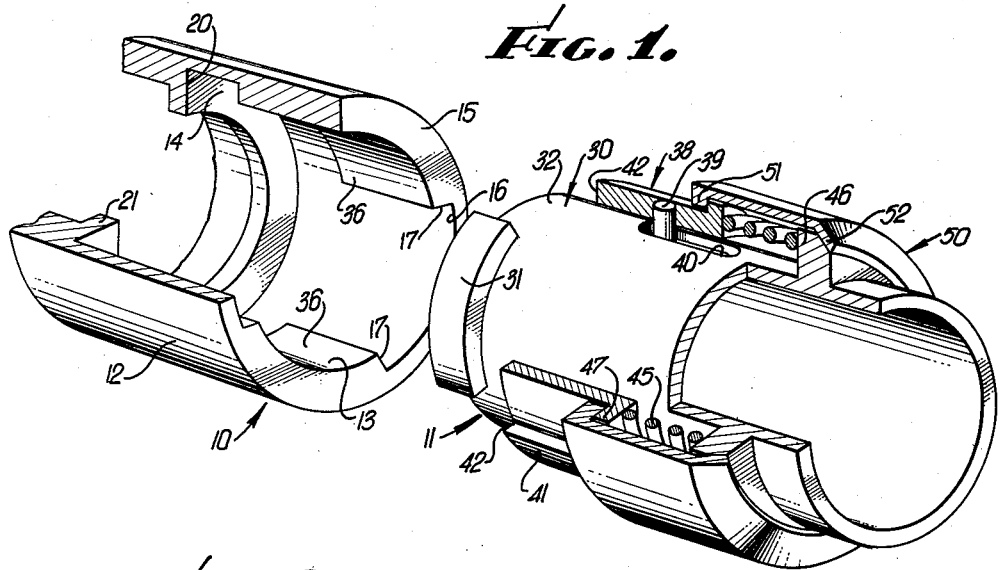
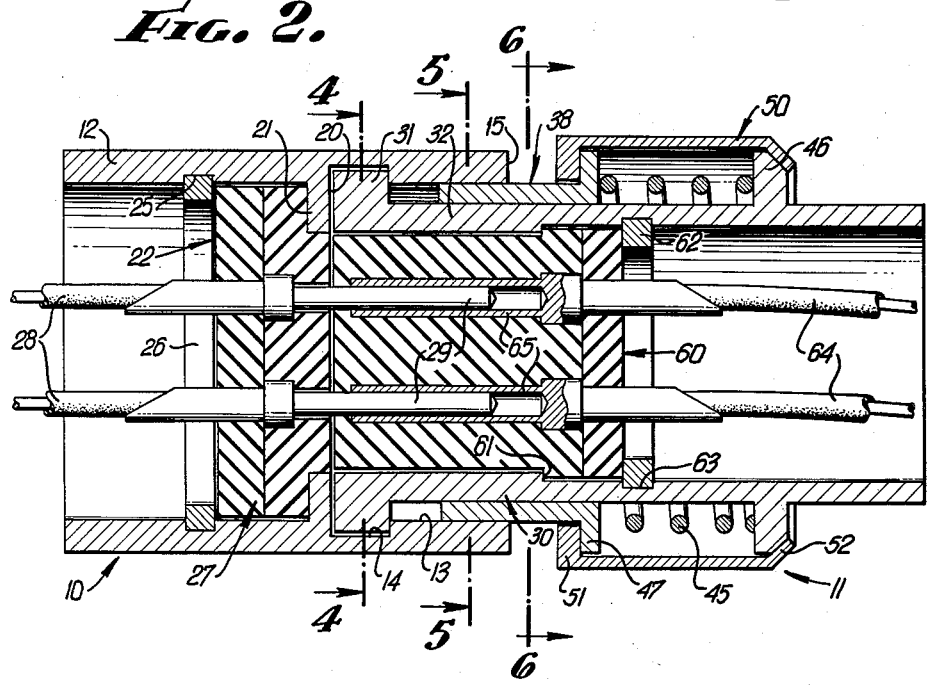
INVENTOR.
WILLIAM MORELLO, JR.
BY
Huebner & Worrel
ATTORNEYS.

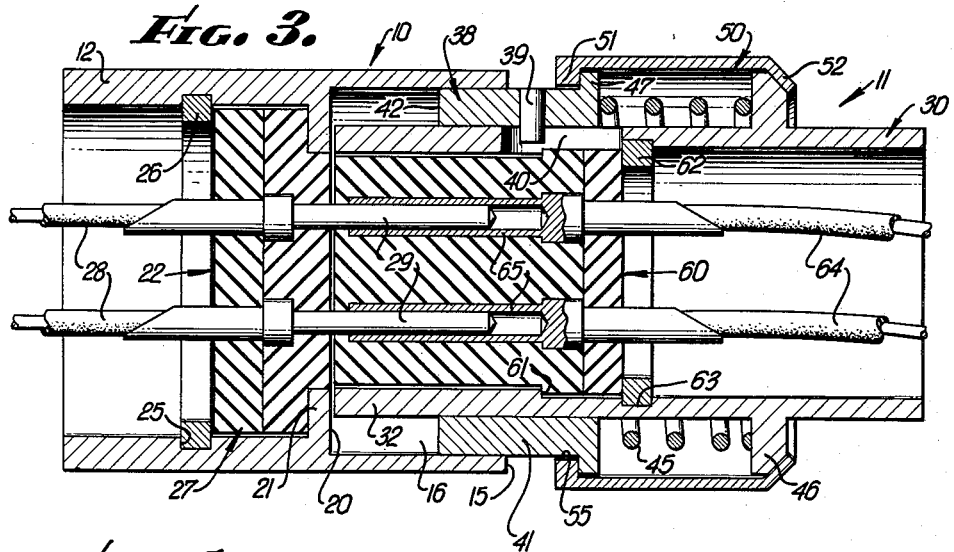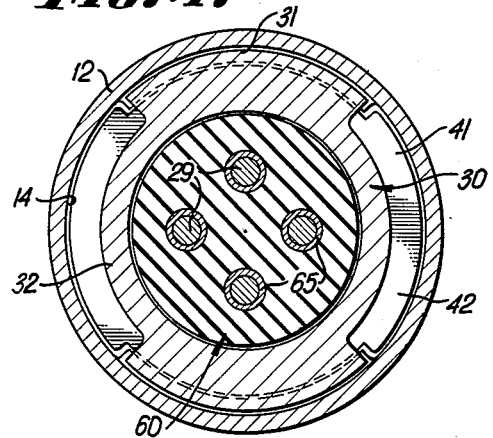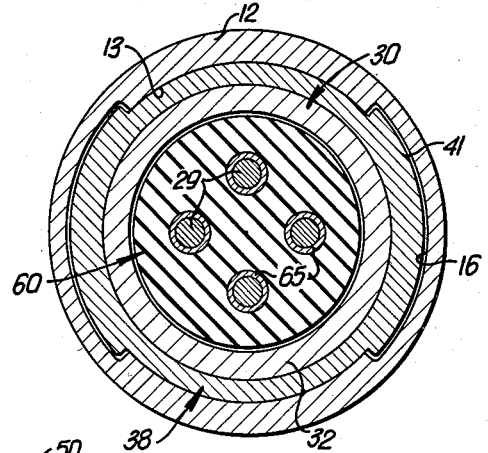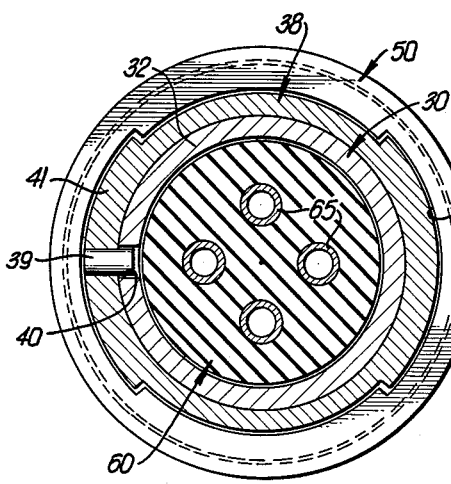
Jan. 7, 1964     W. MORELLO, JR     3,116,942
QUICK COUPLING DEVICE
Filed Oct. 10, 1960     2 Sheets-Sheet 2
INVENTOR.
WILLIAM MORELLO, JR.
BY
Huebner & Worrel
ATTORNEYS.

United States Patent Office 3,116,942
Patented Jan. 7, 1964

3,116,942
QUICK COUPLING DEVICE
William Morello, Jr., Wakefield, Mass., assignor to Cannon Electric Company, Los Angeles, Calif., a corporation of California
Filed Oct. 10, 1960, Ser. No. 61,426
2 Claims. (Cl. 285—85)

This invention relates to a quick coupling device having a general utility for rapidly and positively associating two tubular members and has particular utility with respect to electrical connectors such, for example, as RF coaxial connectors, pin and socket connectors, and various other types of both single and multiple electrical connectors.

A general object of the present invention is to provide a quick coupling device in which a plug is joined to a receptacle by the insertion of the plug in the receptacle followed by a relative rotation of approximately 90 degrees, whereupon the plug and receptacle automatically become positively interlocked against further rotation or axial separation; and in which the interlocking is accomplished by rigid and positive mechanical abutment of non-yielding parts without reliance upon springs or auxiliary devices for the primary coupling retention.

A further object of the invention is to provide in a quick coupling device of the general character identified a metal-to-metal shouldered joint interlocking means, and in which the only spring required is a relatively thin, low-strength compression spring functioning to support merely the weight of a locking member and thus to effect the axial positioning of said locking member.

A further object of the invention is to provide a quick coupling joint affording ease of operation and convenient adaptability to the reception of electrical connectors. In applications where coupling rotation with respect to the connector shell is desired, the connector shell may have a rotational fit within the coupling, and if no rotation with respect to the connector shell is desired, the connector shell may be inserted in the coupling with a tight or locked fit whereby it or one of its parts rotates with the coupling element.

A further object of the invention is to provide a quick coupling of the general type described which may itself serve as the shells for the insulator blocks or support elements of the electrical connector, such elements either loosely fitting in the coupling plug and receptacle respectively for rotation relative thereto, or be installed with a tight fit in either one or both of the coupling members so that there is no relative rotation between the connector terminal assembly and the coupling members.

These and other objects of the invention will become more apparent from a consideration of the description which follows, taken in conjunction with the drawings:

FIG. 1 is a perspective view, partly in section of a receptacle member and a plug member, separated, but which when joined comprise the quick coupling embodying the present invention;

FIG. 2 is a longitudinal cross-section of the assembled coupling, and includes an electrical connector by way of an example of the use of the coupling;

FIG. 3 is a view similar to FIG. 2 taken across a different diameter than that of FIG. 2;

FIG. 4 is a cross-sectional view taken on the line 4—4 of FIG. 2;

FIG. 5 is a cross-sectional view taken on the line 5—5 of FIG. 2; and

FIG. 6 is a cross-sectional view taken on the line 6—6 of FIG. 2.

Referring to FIG. 1, the invention comprises, in its primary aspects, a tubular receptacle member 10, and a tubular plug member 11 adapted to be received axially into the receptacle member and to be interlocked therein against both axial and rotational movement.

The receptacle comprises a sleeve 12 having a basic (or minor) internal bore 13 interrupted by a circumferential groove 14 axially spaced from a forward end 15 and joining an axially-extending groove 16 which continues from its junction with the annular groove 14 to the end 15 of the sleeve. The end 15 presents annular plane surfaces as illustrated, affording stop means for purposes hereinafter made apparent. The walls 17 defining the radial faces of the groove 16 provide stops against relative rotational movement of the sleeve and plug as hereinafter appears. For coupling purposes the rearward planular wall 20 of the circumferential groove 14 acts as a stop upon axial introduction of the plug into the receptacle, and for coupling purposes need be only wide enough to serve its function as a stop; however, it has been illustrated as enlarged by a flange 21 which may be employed in conjunction with location and lodging of one section of an electrical connector 22 as seen in FIG. 2. The sleeve 12 may also be formed with a minor circumferential groove 25 to receive a retaining ring 26 which, in cooperation with the flange 21 will retain an insulation body assembly 27 of the connector. Electrical conductors 28 are shown as leading to contact terminal pins 29.

It should be understood that the connector illustrated is by way of example, and not of limitation as a use to which the quick coupling may be put. Numerous other types of connectors may be contained in the coupling including RF coaxial connectors, some connectors having metallic shells containing the insulation members, and any of the connectors may be either rotatable relative to the coupling elements or frictionally or otherwise secured nonrotatably therein, as may be desired in the particular case.

While only one groove 16 has been described, the preferred form of device includes a duplicate groove diametrically located.

The plug 11 comprises a primary sleeve 30 of such base external diameter as to conveniently slide into the bore 13 of the receptacle sleeve. This plug sleeve 30 is provided with a pair of lands 31 positioned at the forward end 32 of the sleeve. These lands are both the same and are structurally designed so that they will slide through the groove 16, and at the full advance of the introductory movement will be aligned with the circumferential groove 14, whereupon the sleeve 30 can be rotated relative to the sleeve 12 and the lands 31 brought to position in groove 14 behind the outer ends of lands 36 which are formed by a combination of the grooves 14 and 16 regarded conjointly.

A second sleeve 38 is slidably positioned on the sleeve 30 and is keyed against relative rotation with the sleeve 30 by a pin 39 secured in the sleeve 38 and having a longitudinally sliding relationship with the walls of a slot 40 in the sleeve 30.

This sleeve 38 is formed with longitudinal external splines 41, the forward ends 42 of which abut against the enlarged segments of the end face 15 of the receptacle sleeve when positioned as shown in FIG. 1. These splines 41 are structurally designed to eventually slide into and fit nicely in the grooves 16 of the receptacle sleeve upon rotation of the plug sleeves 30 and 38 together after full advancement has been made of the plug 30 into the receptacle sleeve so that the lands 31 are in position for rotation in the circumferential groove 14. When the parts are thus coupled the cooperative action of the lands 31 and the groove 14 restrains the two major parts from axial movement, and the cooperative relationship of the splines 41 in the grooves 16 restrains the two major parts against relative rotational movement.

A sliding action of the sleeve 38 is aided by a coil compression spring 45 which bears at its rear end against a flange 46 on the sleeve 30 and at its forward end against the rearward flanged extremity 47 of the sleeve 38. The spring is lightly acting, and readily yields to permit retraction of the sleeve 38 upon the initial axial movement of the plug 30 into the receptacle, and when the plug sleeve 30 is subsequently rotated the necessary amount, the spring 45 urges the sleeve 38 into the bore of the receptacle to effect the rotational locking of the two major parts. The spring 45 performs no locking function per se and its strength need merely be sufficient to overcome the weight of the sleeve 38 in order to insure that the sleeve remains in the receptacle so that the splines 41 will remain seated in the grooves 16.

Assuming that the sleeve 38 is positioned in the locking relationship with receptacle sleeve 12 it is necessary that some part or adjunct of the sleeve 38 be manually available outside the end 15 of the receptacle so that the sleeve 38 may be axially withdrawn when desired for the purpose of uncoupling the device. The flange 47 could be used for this purpose, but for completeness as well as convenience and general appearance, it is preferred to utilize an actuating sleeve 50 which has a forward flange 51 engageable with the flange 47, and a rearward flange 52 engageable with the flange 46.

The actuating sleeve 50 is formed with slots 55 in the flange 51 receiving the splines 41, so that while relative axial movement may occur between the sleeves 38 and 50, they are forced to rotate together.

By way of example only, and not by way of limitation, there is illustrated a connector insulation assembly 60 retained in the plug of the coupling by the cooperative action of an annular shoulder 61 in the sleeve 38 and an annular retaining ring 62 in a groove 63. Conductors 64 connect with socket terminals 65 held in the insulation assembly, the sockets 65 physically and electrically making contact with the pins 29. Applying the principles previously mentioned, the installation assembly 60 may, of itself, or upon enclosure within a shell, be either loosely retained in the sleeve 30 for relative rotation of the sleeve and the insulation assembly, or, if desired, it may be tightly lodged therein to rotate with the sleeve.

In use, one hand can grasp the receptacle sleeve 12 and the other hand can grasp the actuating sleeve 50 and upon correct aligning of the lands 31 with the grooves 16 the plug is introduced in the receptacle until the lands 31 have abutted against the rearward wall 20 of the grooves 14. At this point the sleeve 50 is given a 90-degree rotation relative to the receptacle. This rotation is transmitted through the sleeve 38 to the sleeve 30 resulting in the lands 31 being lodged behind the lands 36, and the splines 41 being lodged in the grooves 16. Initially the sleeve 38 was retracted rearwardly against compression of the spring 45 by the manual pressure utilized in axially introducing the plug into the receptacle, and when the proper rotational alignment subsequently occurs, the splines 41 automatically slip into the grooves 16 under urging of the spring 45, and an audible click will be heard indicating that the interlocking of the two coupling parts has been achieved.

For uncoupling, the actuating sleeve 50 is pulled axially with respect to the receptacle sleeve 12 to bring the splines 41 out of the grooves 16, and the sleeve 50 is then rotated to position the lands 31 in alignment with the grooves 16, whereupon the receptacle and plug may be axially separated.

While the present invention has been described herein in what is considered to be a preferred embodiment thereof, it should be recognized that departures may be made therefrom within the scope of the invention, and it should therefore not be limited to the details of the within disclosure, but should be accorded the full scope of the appended claims.

I claim as my invention:

1. A quick make or release coupling comprising a tubular receptacle and a tubular plug adapted to axially enter the receptacle and become releasably interlocked therewith against relative rotational or axial movement, the receptacle having an internal 360° circumferential groove axially spaced from the plug receiving end and a pair of diametrically opposed internal axially extending grooves joining the circumferential groove and continuing to the plug receiving end, the plug embodying a primary sleeve including a pair of diametrically opposed external circumferential lands adapted to slide axially through the axially extending grooves to the radial plane of the circumferential groove and to be rotated in the latter to axially interlock the receptacle and the primary sleeve of the plug, the plug including a second sleeve reciprocable relative to the primary sleeve, said second sleeve having an external base diameter and a pair of diametrically opposed splines projecting radially therefrom, the splines meeting and being stopped by the plug receiving end of the receptacle during axial introduction of the primary sleeve into the receptacle, a key and slot slidably and non-rotationally keying the second sleeve to the primary sleeve for rotation therewith, the splines being aligned with the axially extending grooves in the receptacle when the receptacle and plug are relatively rotated a requisite amount and the second sleeve being thereupon slidable into the receptacle with the splines engaging in the axially extending grooves and interlocking the receptacle and plug against relative rotation, external annular flanges on the primary and second sleeves respectively, a coil compression spring encircling the primary sleeve and interposed between said flanges yieldably urging the second sleeve toward the receptacle to aid in advancing the splines into the axially extending grooves and retaining the splines in engagement in such grooves, a third sleeve enclosing the spring and provided with internal spaced flanges engageable respectively with the flanges on the primary and second sleeves, the flange of the third sleeve which is engageable with the flange of the second sleeve having diametrically opposed notches, said notches slidably receiving the splines of the second sleeve to prevent relative rotation between the second and third sleeves and enable a user by grasping the third sleeve to impart manual axial movement of the primary sleeve relative to the second and third sleeves and manual rotation of the third sleeve to impart rotation to the second and the primary sleeves.

2. A quick make or release coupling comprising a tubular receptacle and a tubular plug adapted to axially enter the receptacle and become releasably interlocked therewith against relative rotational or axial movement, the receptacle having an internal circumferential groove axially spaced from the plug receiving end an an internal axially extending groove joining the circumferential groove and continuing to the plug receiving end, the plug embodying a primary sleeve including an external circumferential land adapted to slide axially through the axially extending groove to the radial plane of the circumferential groove and to be rotated in the latter to axially interlock the receptacle and the primary sleeve of the plug, the plug including a second sleeve reciprocable relative to the primary sleeve, said second sleeve having an external base diameter and a spline projecting radially therefrom, the spline meeting and being stopped by the plug receiving end of the receptacle during axial introduction of the primary sleeve into the receptacle, the second sleeve being keyed to the primary sleeve for rotation therewith, the spline being aligned with the axially extending groove in the receptacle when the receptacle and plug are relatively rotated a requisite amount and the second sleeve being thereupon slidable into the receptacle with the spline engaging in the axially extending groove and interlocking the receptacle and plug against relative rotation, external annular flanges on the primary and second sleeves respectively, a coil compression spring interposed between said flanges yieldably urging the second sleeve toward the receptacle to aid in advancing the spline into the axially extending groove and retaining the spline in engagement in such groove, and externally accessible means to manually withdraw the second sleeve against the pressure of the spring in order to free the primary sleeve for rotation relative to the receptacle so as to release the land from the circumferential groove for separation of receptacle and plug, said externally accessible means including a third sleeve enclosing the spring and provided with internal spaced flanges engageable respectively with the flanges on the primary and second sleeves, the flange of the third sleeve which is engageable with the flange of the second sleeve having a notch, said notch slidably receiving the spline of the second sleeve to prevent relative rotation between the second and third sleeves and enable manual rotation of the third sleeve to impart rotation to the second and the primary sleeves.

References Cited in the file of this patent

UNITED STATES PATENTS

| | | |
|---|---|---|
| 1,221,935 | White | Apr. 10, 1917 |
| 2,561,677 | Souriau | July 24, 1951 |
| 2,606,224 | Modrey | Aug. 5, 1952 |
| 2,613,089 | Maiman | Oct. 7, 1952 |
| 2,728,895 | Quackenbush et al. | Dec. 27, 1955 |
| 2,829,358 | Testori | Apr. 1, 1958 |
| 2,893,694 | Waggener | July 7, 1959 |
| 2,950,929 | Nicolson | Aug. 30, 1960 |